(12) United States Patent
Gorokhov et al.

(10) Patent No.: US 7,903,615 B2
(45) Date of Patent: Mar. 8, 2011

(54) SPACE DIVISION MULTIPLE ACCESS CHANNELIZATION IN WIRELESS COMMUNICATION SYSTEMS

(75) Inventors: Alexei Gorokhov, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 11/869,589

(22) Filed: Oct. 9, 2007

(65) Prior Publication Data

US 2008/0084843 A1 Apr. 10, 2008

Related U.S. Application Data

(60) Provisional application No. 60/828,821, filed on Oct. 10, 2006.

(51) Int. Cl.
*H04B 7/216* (2006.01)
(52) U.S. Cl. .......................... 370/335; 370/342
(58) Field of Classification Search ................ 370/342, 370/335
See application file for complete search history.

(56) References Cited

U.S. PATENT DOCUMENTS

| 2002/0159431 | A1 | 10/2002 | Moulsley et al. | |
|---|---|---|---|---|
| 2003/0108089 | A1* | 6/2003 | Lee et al. | 375/146 |
| 2005/0249322 | A1* | 11/2005 | Gerlach | 375/355 |
| 2005/0265222 | A1* | 12/2005 | Gerlach | 370/208 |
| 2006/0120471 | A1* | 6/2006 | Learned et al. | 375/260 |
| 2007/0097909 | A1* | 5/2007 | Khandekar et al. | 370/342 |
| 2008/0101214 | A1* | 5/2008 | Jitsukawa et al. | 370/208 |
| 2008/0181181 | A1* | 7/2008 | Gorokhov et al. | 370/335 |
| 2008/0248824 | A1* | 10/2008 | Fukui | 455/509 |
| 2008/0298524 | A1* | 12/2008 | Koorapaty et al. | 375/348 |
| 2010/0098042 | A1* | 4/2010 | Dent | 370/342 |

FOREIGN PATENT DOCUMENTS

| EP | 09084563 A2 | 3/2000 |
|---|---|---|
| WO | 2005099125 | 10/2005 |
| WO | 2005122619 | 12/2005 |
| WO | 2006099577 | 9/2006 |
| WO | WO2006099545 A1 | 9/2006 |

OTHER PUBLICATIONS

International Preliminary Report on Patentability—PCT/US07/081013, International Seach Authority—European Patent Office, Nov. 11, 2008.
International Search Report—PCT/US07/081013, International Search Authority—European Patent Office—May 19, 2008.

* cited by examiner

*Primary Examiner* — Andrew Lee
(74) *Attorney, Agent, or Firm* — Darrell Scott Juneau; Liem T. Do

(57) ABSTRACT

Space division multiple access channelization is provided that includes scheduling transmission for two or more terminals and utilizing different code offsets that correspond to different sub-trees. The transmissions can be scheduled on overlapping frequency resources for overlapping time periods on different spatial resources. The pilot code offsets provide different pilot signatures so that the pilot transmissions do not overlap. The overlapping frequency resources can partially overlap or completely overlap.

24 Claims, 14 Drawing Sheets

SPACE DIVISION MULTIPLE ACCESS CHANNELIZATION IN WIRELESS COMMUNICATION SYSTEMS

CROSS-REFERENCE

This application claims the benefit of U.S. Provisional Application Ser. No. 60/828,821, filed Oct. 10, 2006, entitled "SPACE DIVISION MULTIPLE ACCESS CHANNELIZATION IN WIRELESS COMMUNICATION SYSTEMS". The entirety of this application is incorporated herein by reference.

BACKGROUND

I. Field

The following description relates generally to wireless communication, and amongst other things, to space division multiple access channelization in wireless communication systems.

II. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices, such as cellular telephones, has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block-hopping scheme.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with SDMA channelization to enable increased sector throughput.

In accordance with an aspect is a method for facilitating channelization in a wireless communication system. The method includes scheduling transmission to at least two terminals on overlapping frequency resources for an overlapping time period on different spatial resources. The method also includes utilizing different code offsets for pilots sent to the at least two terminals, wherein the different code offsets correspond to different sub-trees. The different code offsets can create different pilot signatures.

Another aspect relates to a wireless communications apparatus that includes a processor and a memory. The processor can execute instructions for scheduling transmission to at least two terminals on overlapping frequency resources for overlapping time periods on different spatial resources so that pilots transmitted to the at least two terminals utilize different code offsets. The memory can store information related to the instructions generated by the processor.

In accordance with another aspect is a wireless communications apparatus that provides space division multiple access channelization. The apparatus includes a means for scheduling transmission to at least two terminals on overlapping frequency resources for overlapping time periods on different spatial resources. The apparatus also includes a means for utilizing different code offsets for pilots sent to the at least two terminals, wherein the different code offsets correspond to different sub-trees.

Still another aspect relates to a machine-readable medium having stored thereon machine-executable instructions for scheduling transmission to at least two terminals on overlapping frequency resources for overlapping time periods on different spatial resources. The machine executable instructions are also for utilizing different code offsets for pilots sent to the at least two terminals, wherein the different code offsets correspond to different sub-trees.

An apparatus operable in a wireless communication system is another related aspect. The apparatus includes a processor that can be configured to schedule transmission to at least two terminals on overlapping frequency resources for overlapping time periods on different spatial resources. The processor can also be configured to utilize different code offsets for pilots sent to the at least two terminals, wherein the different code offsets correspond to different sub-trees.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
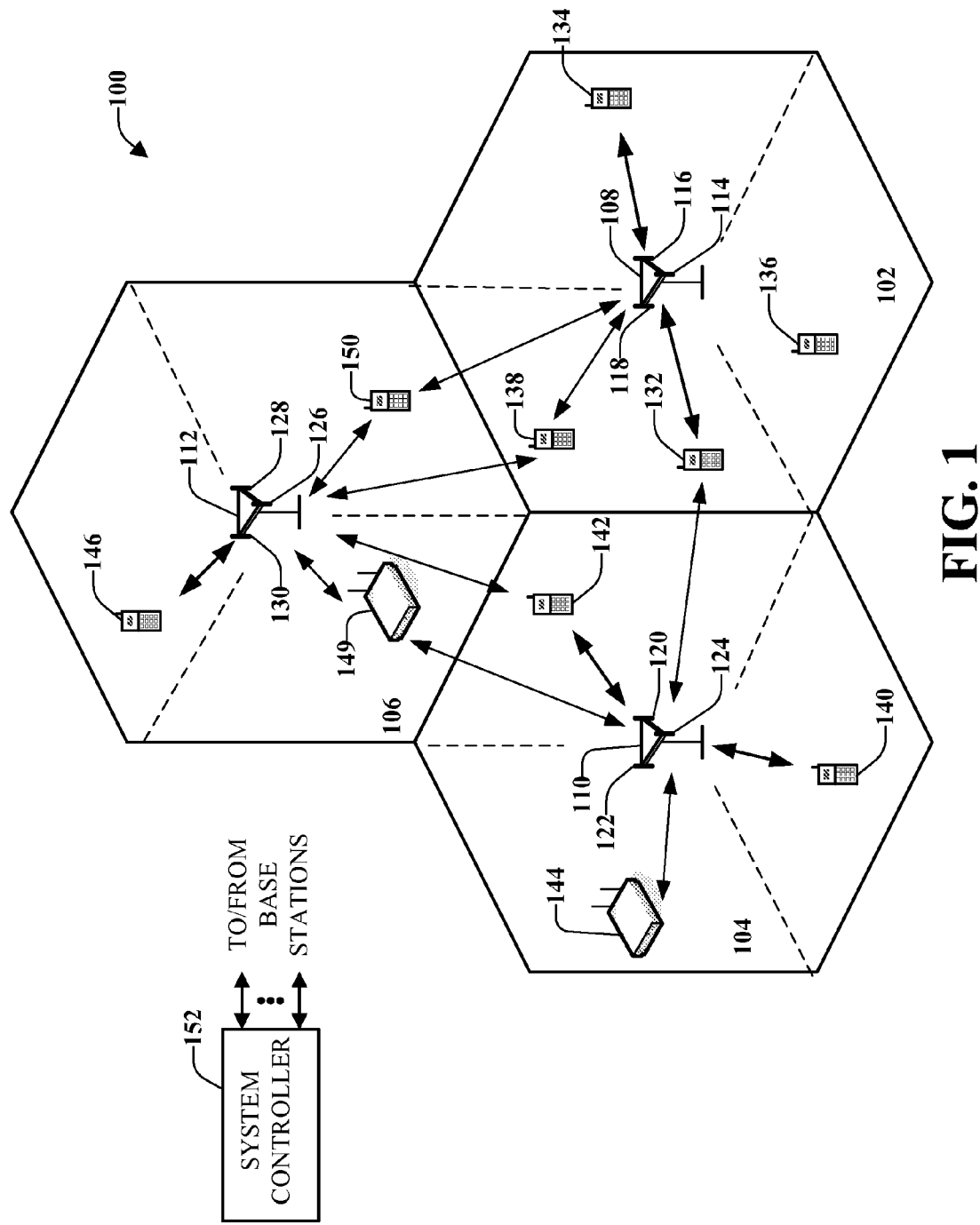
FIG. 1 illustrates a multiple access wireless communication system according to various embodiments for space division multiple access channelization.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology).

Various aspects or features will be presented in terms of systems that may include a number of devices, components, modules, and the like. It is to be understood and appreciated that the various systems may include additional devices, components, modules and/or may not include all of the devices, components, modules discussed in connection with the figures. A combination of these approaches may also be used.

FIG. 1 illustrates a multiple access wireless communication system 100 according to various embodiments for space division multiple access channelization. In further detail, a multiple access wireless communication system 100 includes multiple cells, e.g. cells 102, 104, and 106. In the embodiment of FIG. 1, each cell 102, 104, and 106 may include an access point 108, 110, 112 that includes multiple sectors. The multiple sectors are formed by groups of antennas each responsible for communication with access terminals in a portion of the cell. In cell 102, antenna groups 114, 116, and 118 each correspond to a different sector. In cell 104, antenna groups 120, 122, and 124 each correspond to a different sector. In cell 106, antenna groups 126, 128 and 130 each correspond to a different sector.

Each cell includes several access terminals, which are in communication with one or more sectors of each access point. For example, access terminals 132, 134, 136, and 138 are in communication with base station 108, access terminals 140, 142, and 144 are in communication with access point 110, and access terminals 146, 148, and 150 are in communication with access point 112.

As illustrated in cell 104, for example, each access terminal 140, 142, and 144 is located in a different portion of it respective cell than each other access terminal in the same cell. Further, each access terminal 140, 142, and 144 may be a different distance from the corresponding antenna groups with which it is communicating. Both of these factors provide situations, also due to environmental and other conditions in the cell, to cause different channel conditions to be present between each access terminal and its corresponding antenna group with which it is communicating.

In accordance with some aspects, access terminals in a particular cell may be in communication with the access point associated with that cell and at substantially the same time be in communication with an access point associated with a different cell. For example, access terminal 132 may be in communication with access point 108 and 110; access terminal 148 may be in communication with access points 110 and 112; and access terminal 150 may be in communication with access points 108 and 112.

A controller 152 is coupled to each of the cells 102, 104, and 106. Controller 152 may contain one or more connections to multiple networks, such as the Internet, other packet based networks, or circuit switched voice networks that provide information to, and from, the access terminals in communication with the cells of the multiple access wireless communication system 100. Controller 152 includes, or is coupled with a scheduler that schedules transmission from and to access terminals. In some embodiments, scheduler may reside in each individual cell, each sector of a cell, or a combination thereof.

In one example, a set of known beams may be utilized at the base-station in order to provide SDMA to enhance scheduling and allow users to be scheduled on overlapping, full or partial, frequency resources during overlapping, full or partial, periods of time. If the base station is aware of the best beam for every user, it can allocate the same channel for different users if they are to be receiving data on different beams.

The SDMA index can be a parameter that may change relatively slowly. This may occur since the index(es) used to calculate the SDMA index captures the spatial statistics of a user, which may be measured by a mobile device. This information can be used by the mobile device to compute the beam desired by it and indicate this beam to the base station. Even without power allocation, knowing the channel at the transmitter improves capacity especially for those systems where the number of transmit antennas $T_M$ is greater than the number of receive antennas $R_M$. The capacity improvement is obtained by transmitting along the directions of the channel Eigen vectors. Feeding back the channel utilizes overhead.

SDMA provides a sufficiently rich set of beams at the transmitter that allows full flexibility in scheduling. The users are scheduled on beams that are signaled to the base station through some feedback mechanism.

In accordance with some aspects, access terminals can be scheduled over SDMA dimensions over substantially similar time-frequency resources on a packet-by-packet basis. In other aspects, each terminal may be scheduled over SDMA dimensions over substantially similar time-frequency resources on a frame-by-frame, super frame by super frame, or a burst-by-burst basis.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors (e.g., having different antenna groups for different sectors), other approaches may be utilized. For example, utilizing multiple fixed "beams" that each cover different areas of the cell in frequency space may be utilized in place of, or in combination with, physical sectors.

Figure 2:
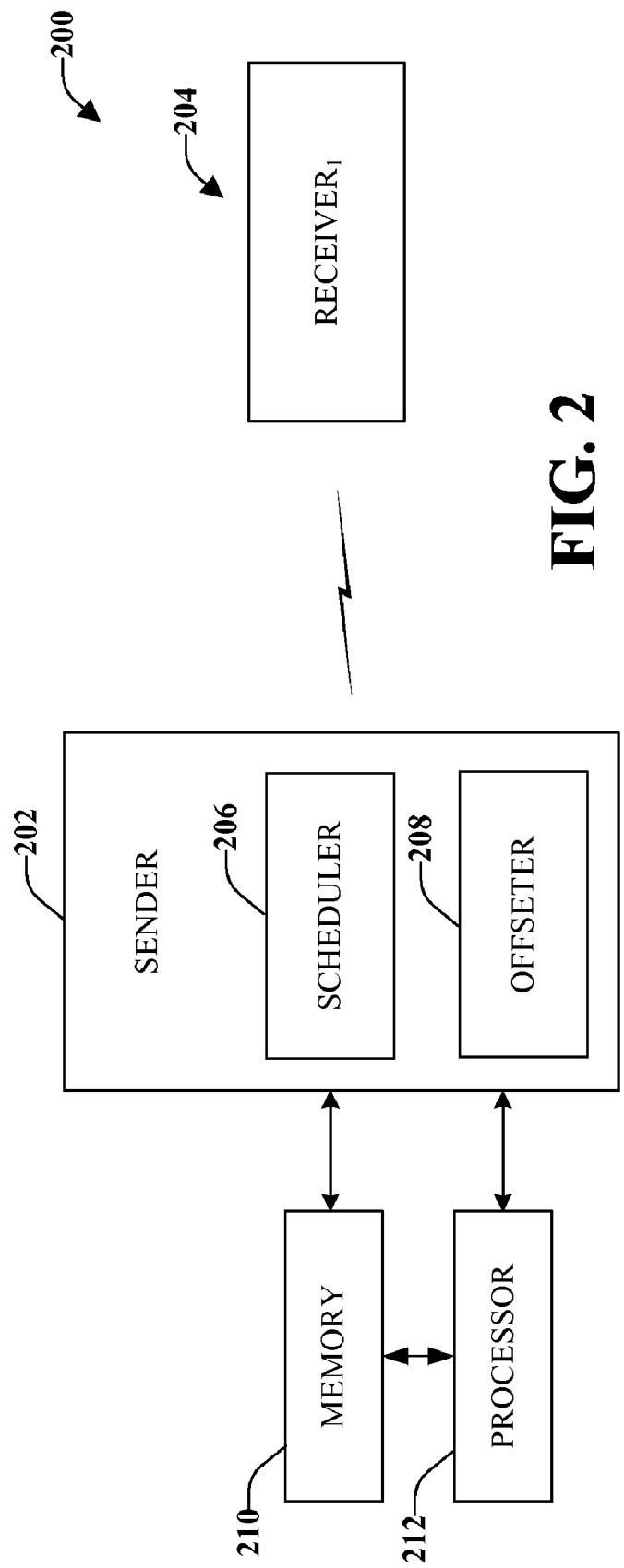
FIG. 2 illustrates an example system that facilitates space division multiple access channelization in a wireless communication system.

FIG. 2 illustrates an example system 200 that facilitates space division multiple access channelization in a wireless communication system. System 200 can be configured to multiplex pilots and acknowledgements. System 200 can further be configured to facilitate Multiple Input-Multiple Output (MIMO) transmission and Space Division Multiple Access (SDMA) transmission at substantially the same time. In order to fully appreciate the disclosed aspects, information relating to MIMO and SDMA transmissions will now be provided.

In a MIMO scheme, multiple packets can be transmitted on the same resource. The broad concept in a MIMO scheme is that two different packets can be transmitted at the same time on the same resource. In MIMO, a base station has multiple antennas, referred to as transmit antennas, and a terminal has multiple antennas, referred to as receive antennas. The base station can transmit different signals from the different antennas and since there are multiple receive antennas, the signals, upon arrival, can be separated and understood at the receiving device. For example, in a two-by-two method the base station has two transmit antennas ($T_{M1}$ and $T_{M2}$) and the terminal has two receive antennas ($R_{M1}$ and $R_{M2}$). The receive antennas $R_{M1}$ and $R_{M2}$ will receive a linear combination of the transmitted signals $T_{M1}$ and $T_{M2}$, which can include some interference or noise. A linear combination can be expressed as follows:

$$\begin{bmatrix} T_{M1} \\ T_{M2} \end{bmatrix} = [H] * \begin{bmatrix} R_{M1} \\ R_{M2} \end{bmatrix} + \begin{bmatrix} N_1 \\ N_2 \end{bmatrix}$$

In a SDMA scheme, instead of having one terminal with multiple antennas, there can be multiple users with one antenna and different beams are sent to different users. Multiple users may be scheduled simultaneously on the same time-frequency resource where their spatial signatures can be distinguished. In SDMA, a sector is split into spatial regions such that user devices in the different regions share the same channel resources, thereby achieving higher spatial reuse. In some other regions, no spatial reuse is allowed. There might be a separate broadcast beam region potentially overlapping with the entire sector that uses dedicated channel resources. This region may be used to transmit dedicated control and/or broadcast data. The regions that are not used for broadcast transmission are referred to as unicast regions. Every unicast region is further subdivided into a set of narrower spatial beams so that a particular beam (or linear combination of beams) within a region can be applied to a particular user device, thereby increasing antenna gain to the user device and limiting spatial spread of the interference created by the transmission.

In both a MIMO scheme and an SDMA scheme, the terminal demodulates one or more received channels based in part on pilots, which are some known symbols utilized by the terminal to estimate the channel (e.g., one antenna has one channel, two antennas have two channels, and so forth). In both MIMO and SDMA, the terminal should multiplex the pilot coming from different antennas because the channel estimate from each antenna needs to be separated. At each receive antenna the pilots from different antennas or both antennas can be multiplexed. Thus, different orthogonal codes can be utilized to transmit pilots corresponding to different antennas (in MIMO) or different beams (in SDMA). In accordance with some aspects, the codes can be DFT codes.

Referring again to FIG. 2, system 200 includes a transmitter 202 that is in wireless communication with a receiver 204. Transmitter 202 can be a base station and receiver 204 can be a communication device, for example. It should be understood that system 200 could include one or more transmitters 202 and one or more receivers 204. However, only one receiver and only one transmitter are shown for purposes of simplicity.

For example, if there are four antennas at the transmitter 202, there are four dimensions. Thus, there can be two MIMO receivers 204, each having two layers (e.g., antennas) or there can be four receivers 204 each having one layer or antenna. There can be other combinations utilizing the four layers, such as three receivers, wherein two receivers have one layer or antenna each and one receiver has two antennas or layers. Another combination can be one receiver having one layer or antenna and a second receiver having three layers or antennas. System 200 can be configured to assign different codes to different layers of the same user (MIMO) or to different receivers (SDMA). Thus, system 200 provides a structure that manages any combination of users and/or layers.

Transmitter 202 can include a scheduler 206 that can be configured to assign or allocate resources. Such allocation can attempt to prevent pilot collisions, sent on a forward link, and/or collision of acknowledgments (ACKs) sent on a reverse link. Such resources can be allocated through utilization of a channel tree, which is a binary tree. Further information relating to channel trees with be discussed with reference to the below figures.

Scheduler 206 can be configured to schedule transmissions to multiple receivers 204. Such transmissions can be scheduled to the receivers 204 on overlapping frequency resources for an overlapping time period on different spatial resources. A different sub-tree of a channel tree can be utilized to schedule the receivers 204.

In accordance with some aspects, scheduler 206 can further be configured to provide distinct acknowledgement resources. In UMB, and each time a base station transmits a packet to a terminal, the terminal replies with an acknowledgement (ACK), which can be a positive ACK (packet received successfully) or a negative ACK (packet not successfully received). In CDMA, the ACK is a channel dedicated to a terminal (e.g., based on MAC ID).

In UMB, the ACK is dedicated to a channel, such that each base node on the channel tree has an associated ACK resource. Thus, if a receiver 204 is assigned a particular node, receiver 204 can correspond that node to a resource on which an ACK can be transmitted on the downlink. With the node on the channel tree assigned to the receiver 204 channels, subsequent ACKs can be sent on a different resource.

Also included in transmitter 202 is an offseter 208 that can be configured to offset the pilot assignments for transmission to the receivers 204 by assigning a different offset code to each pilot. The pilots have different code offsets corresponding to different sub-trees so that the pilot transmissions do not overlap. In accordance with some aspects, the description of all sub-trees, except for the first sub-tree can be deferred to later overhead channels since this information is not necessary to demodulate control segment and overhead channels sent in non-MIMO non-SDMA mode.

The offset can be at least a number of spatial dimensions utilized for transmission to one or more receiver 204. Since multiple receivers can be assigned the same channel ID, each user should be assigned a different pilot and pilot code or pilot signature (PS), which allows each receiver to estimate the channel. Scheduler 208 can assign the receivers with the respective pilot signature by specifying the receiver's first layer. This will be explained with the following example. There are four users, each user having one layer. Thus, for example, Receiver$_1$ can be provided Pilot Signature 0 (PS$_0$), Receiver$_2$ can be provided PS$_1$, Receiver$_3$ can be provided PS$_2$, and Receiver$_4$ can be provided PS$_3$.

In another example, there are two receivers and each receiver (in MIMO) has two layers. Thus, offseter 208 can assign the first receiver PS$_0$ and the second receiver can be assigned PS$_2$. When first receiver is assigned PS$_0$ (and it has two layers), the receiver understands that it is to utilize PS$_0$ and PS$_1$. When the second receiver is assigned PS$_2$, receiver understands that it is to utilize PS$_2$ and PS$_3$. It should be understood that there could be a different number of receivers and different combinations of layers or antennas, as discussed above.

Thus, since there are many pilot signatures, offseter 208 attempts to send an offset and assigns the pilot signature that corresponds to the first layer of receiver 204. For the subsequent layers, the receiver 204 would increment the index by one, up to the number of layers.

In accordance with some aspects, scheduler 206 can be configured to utilize scheduling techniques to reduce an assignment size without changing positions of ACKs. For example, scheduler 206 can first assign a subset of nodes by eliminating nodes after the last ACK and then assigning a subset of nodes by eliminating nodes before the first ACK.

System 200 can include a processor 210 operatively connected to transmitter 202 (and/or memory 212) to execute instructions relating to multiplexing pilots and multiplexing assignments. Processor 210 can be a processor dedicated to assigning resources and/or generating information received by transmitter 202. Processor 210 can also be configured to execute instructions relating to scheduling transmissions to two or more terminals on overlapping frequency resources for overlapping time periods on different spatial resources. Processor 210 can schedule the transmissions so that pilots transmitted to the receivers utilize different codes that are offset from each other on the overlapping time or frequency resources. The code offsets can correspond to different sub-trees. Processor 210 can also be a processor that controls one or more components of system 200 and/or a processor that both analyzes and generates information received by transmitter 202 and controls one or more components of system 200.

Memory 212 can store information related to the instructions executed by processor 210 and other suitable information related to SDMA and/or MIMO channelization in a wireless communication network. Memory 212 can further store protocols associated with taking action to control communication between transmitter 202 and receiver 204, etc., such that system 200 can employ the stored protocols and/or algorithms to implement the various aspects disclosed herein.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 210 of the disclosed embodiments are intended to comprise, without being limited to, these and other suitable types of memory.

Figure 3:
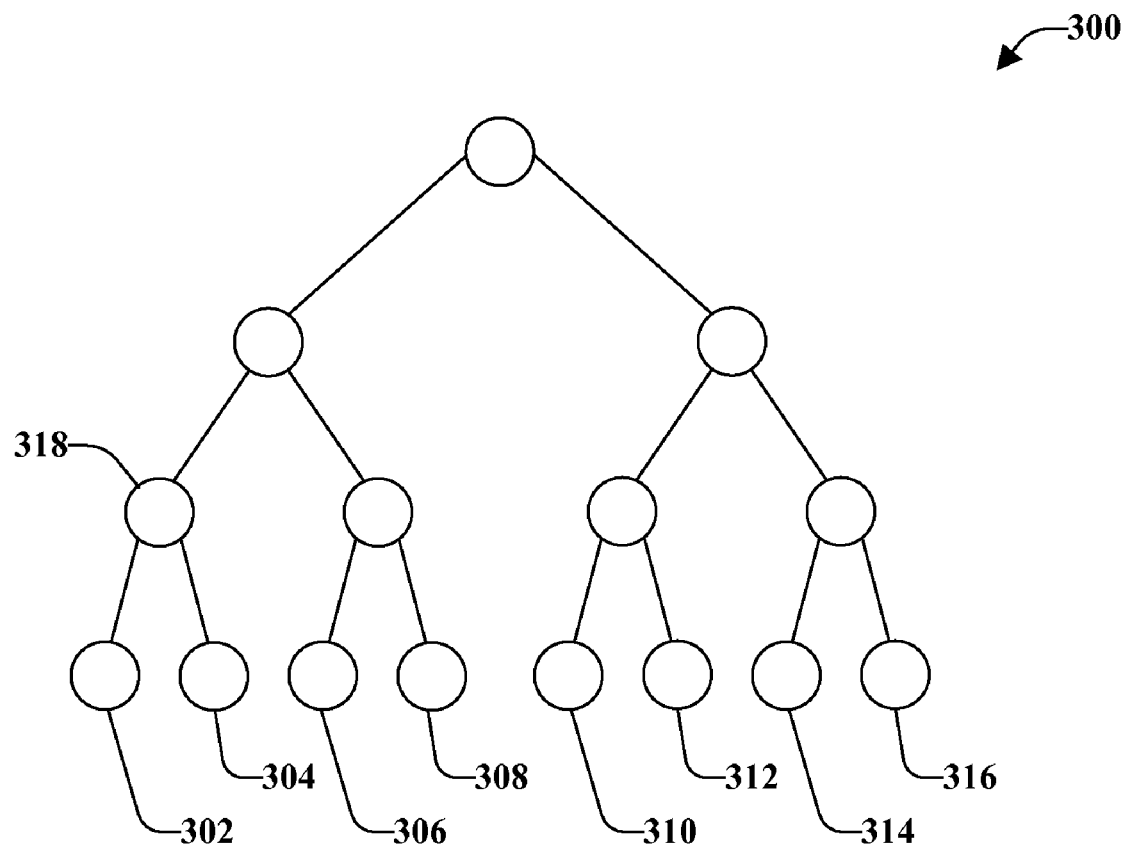
FIG. 3 illustrates an example section of a channel tree structure.

An example section of a channel tree structure 300 is illustrated in FIG. 3. The channel tree 300 can be utilized by a base station in connection with allocating resources on a forward link within an OFDM/OFDMA wireless communications environment. The tree structure 300 represents a mapping of port space onto an available frequency region. Base nodes 302 through 316 of the tree structure 300 may correspond to non-overlapping contiguous tones. This allows access terminals scheduled within the same tree to be associated with orthogonality. In conventional OFDM/OFDMA systems, a single tree structure can be employed to schedule communications within a sector, wherein terminals scheduled within the channel tree 300 are associated with channel orthogonality. To enable employment of SDMA, multiple channel trees 300 can be used, wherein receivers 304 on disparate trees can utilize substantially similar time-frequency resources.

Each node in the channel 300 represents a channel. Since there is frequency hopping, logically each receiver is assigned a node of the channel. In a frequency hopping pattern, at different times or frames of the same interlace, the nodes will map to different physical patterns to facilitate frequency hopping. The nodes map orthogonally such that no two nodes map to the same physical resource at the same time. Thus, in the channel tree 300 at any moment, the nodes map to a set of resources. Such mapping can be facilitated by base station and the mapping can be in a random fashion.

Each node in the channel tree 300 has a node identifier (ID). When a node is assigned, the channel ID for that node is communicated to the terminal. It should be understood that the illustrated channel tree 300 is a portion of a channel tree. A complete channel tree can have thirty-two nodes at the base level, which is the level illustrated by nodes 302-316. The next level higher in the tree (e.g., the level represented by node 318) can have sixteen nodes. The next level higher can have eight nodes, another level higher has four nodes, then two nodes at the next level higher. The highest level is represented by one node.

Thus, if terminal has an assignment for node 304, that is the channel utilized by terminal. If a terminal is assigned node 318, receiver has two nodes 302 and 304. At any point in time on a given frame, if these two nodes 302 and 304 map in a hopping patter to this channel, receiver will transmit data on this physical tile, wherein each tile is sixteen tones. The channel tree 300 addresses frequency and moving up in the tree provides more frequency.

In either or both SDMA or MIMO, the same resource is assigned to multiple receivers or multiple layers of the same receiver. Thus, base station will be transmitting two signals. In MIMO, the two signals are overlapping signals to the same terminal. The amount of resources does not change, it is the same resource and two signals are overlaid on the same resources.

By way of example and not limitation, a base station has two antennas ($T_{M1}$ and $T_{M2}$) and a receiver has two antennas ($R_{M1}$ and $R_{M2}$). In an ideal system, the communication from $T_{M1}$ would be received by $R_{M1}$ and communication from $TM_2$ would be received by $R_{M2}$, without any cross-talk between the communication. An orthogonal matrix representing this is illustrated below:

$$H = \begin{bmatrix} 1 & 0 \\ 0 & 1 \end{bmatrix}$$

where $T_{M1}$ is received by $R_{M1}$, represented by "1" (in the top of the matrix), since, in an ideal system, $R_{M1}$ does not receive a signal received from $T_{M2}$, it is represented by "0" (in the top of the matrix). Similarly, in an ideal system $R_{M2}$ does not receive a signal from $T_{M1}$, thus, "0" is in the lower portion of the matrix. The "1" in the lower portion of the matrix indicates that a signal from $T_{M2}$ is received at $R_{M2}$.

However, the pure signals received in an ideal system generally do not occur. What does generally occur is that both transmit antennas contribute to the communication received at both receive antennas. Thus, the signals can be separated by utilizing a filter F, as represented by the following matrix:

$$F * H = \begin{bmatrix} 1 & 0 \\ 0 & 1 \end{bmatrix}$$

In a MIMO scheme, a terminal is obtaining two signals on the same resources. In a SDMA scheme, the same node is assigned to different receivers. Thus, in SDMA, a first receiver and a second receiver are both assigned to a node and both receivers are provided with the same Node ID. The beams utilized in SDMA are different for each receiver and are separated in space, which minimizes leakage or crosstalk. The transmissions in MIMO can overlap utilizing a filter, as illustrated in the above matrix. Thus, in MIMO the receiver should estimate the channel separately from a first antenna and a second antenna. In SDMA, the receiver estimates the channel that corresponds to different beams.

If receiver is assigned, not at the base level of a channel tree, but higher up in the tree (such as node 318 in FIG. 3). Then receiver can utilize either ACK resource (such as nodes 302 or 304 in FIG. 3). Generally, receiver 304 will choose the left-most base node to determine the resources. Thus, if user is assigned node 318, the ACK will be sent on node 302 rather than node 304.

In the situation where the transmission is to multiple users on the same resources, the ACK is not transmitted on the same resources for the different users because the ACKs will collide. For example, in multi-codeword (MCW) MIMO if the resources are assigned to one user having multiple layers, the ACKs need to be sent separately since one layer might be decoded and the other layer not decoded. Thus, the ACK should be associated with the particular layer being acknowledged.

Thus, multiple ACKs should be associated with the same resources. A simple solution is to provide each node multiple ACKs. If there are two receivers, a first receiver will be instructed to use a first ACK and a second receiver will be instructed to use a second ACK. However, this increases the number of ACK resources needed, and the solution would be to increase the number of ACK resources.

However, in an SDMA scheme with two users, for example, the users should be multiplexed so that the assignment is at least two nodes. For example, if a first user and a second user are assigned node 318 the first user can utilize node 302 to send an ACK and the second user can utilize node 304 to send an ACK. Thus, in SDMA, two terminals cannot be assigned the same base node because then the ACK would be assigned the same resources. However, in SDMA two terminals can be assigned the same higher level node. Similarly, if there are three terminals, there should be at least three nodes assigned; for four terminals there should be four terminals assigned, and so forth.

Figure 4:
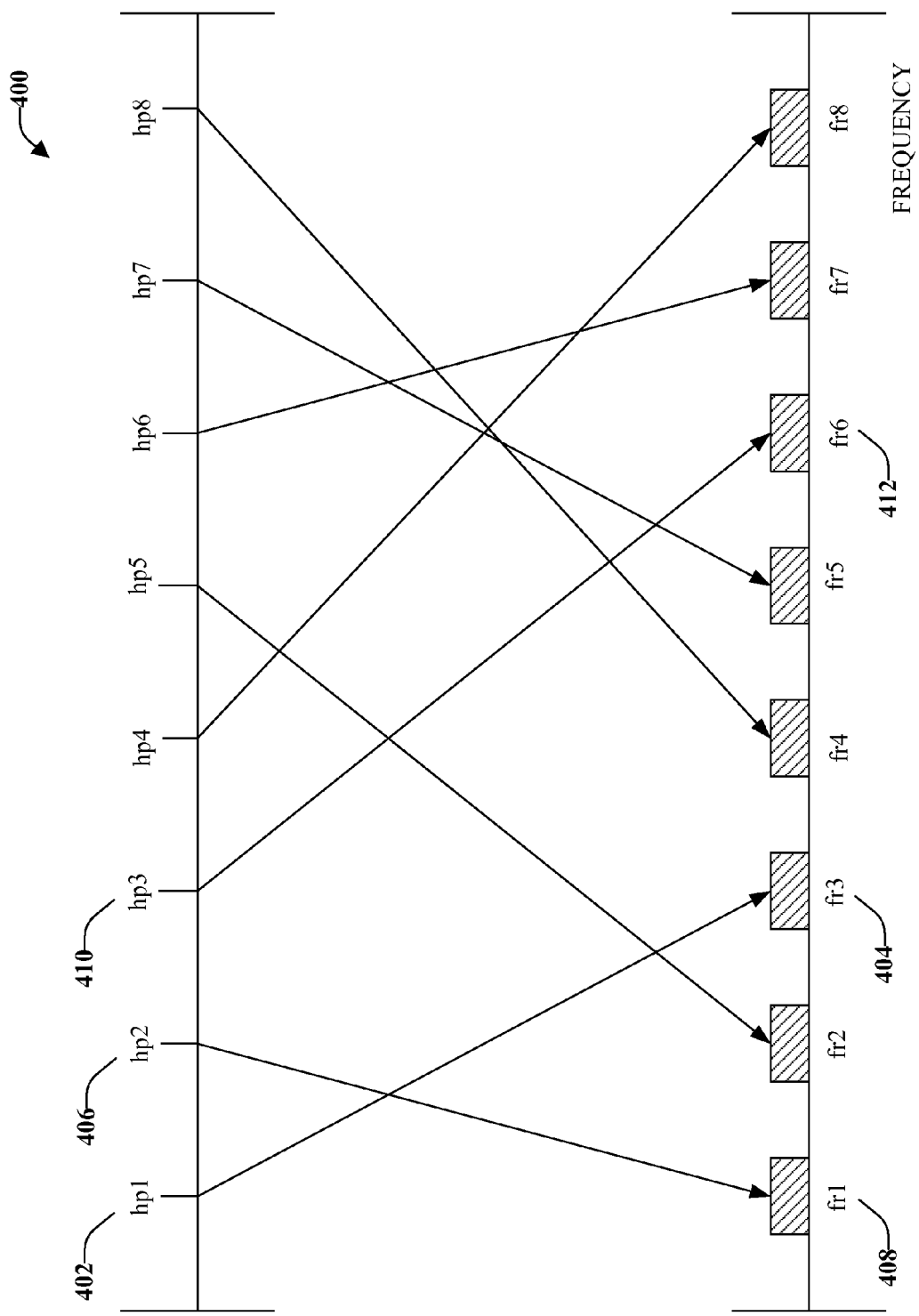
FIG. 4 illustrates an exemplary graphical depiction of a mapping between hop-ports and frequency regions.

Furthermore, while shown as a tree, in accordance with some aspects, the channel tree structure 300 can be retained in matrix form or other suitable form to assist in scheduling access terminals in a wireless communications environment The following figures will illustrate and describe the various aspects described above in further detail. Turning to FIG. 4, illustrated is an exemplary graphical depiction of a mapping 400 between hop-ports and frequency regions. This is represented by the base nodes 302-316 of the tree structure 300 (FIG. 3). The mapping can correspond to one particular permutation, as hop-ports can be subject to mapping to various frequency ranges given disparate permutations. In particular, the tree structure 300 can include eight base nodes 302, 304, 306, 308, 310, 312, 314, and 316. Accordingly, eight hop-ports may be mapped to eight different frequency ranges that are within an available frequency region during one hop permutation.

In further detail, a first hop-port (hp1) 402 can be mapped to a third frequency range (fr3) 404, a second hop-port (hp2) 406 can be mapped to a first frequency range (fr1) 408, a third hop-port (hp3) 410 can be mapped to a sixth frequency range (fr6) 412, and so forth during the hop permutation. It should be understood that this mapping is for illustration purposes only. These mappings can be assigned randomly, pseudo-randomly, or through any other suitable means. Furthermore, the mappings can be re-assigned during particular time intervals and/or according to a permutation schedule. It is also to be understood that these mappings enable access terminals that are associated with the hop-ports within a channel tree to remain related to orthogonal channels (e.g., the frequency ranges can be created in such a way to maintain orthogonality).

In some aspects, the mappings may be replaced by subcarrier mappings or subcarrier sets, which in one aspect, may comprise at least two groups of subcarriers. In an aspect, the groups of subcarriers may be disjoint from each other, while the subcarriers in each group are contiguous with each other. In such a way, resources may be efficiently provided while facilitating some diversity for each assignment.

Figure 5:
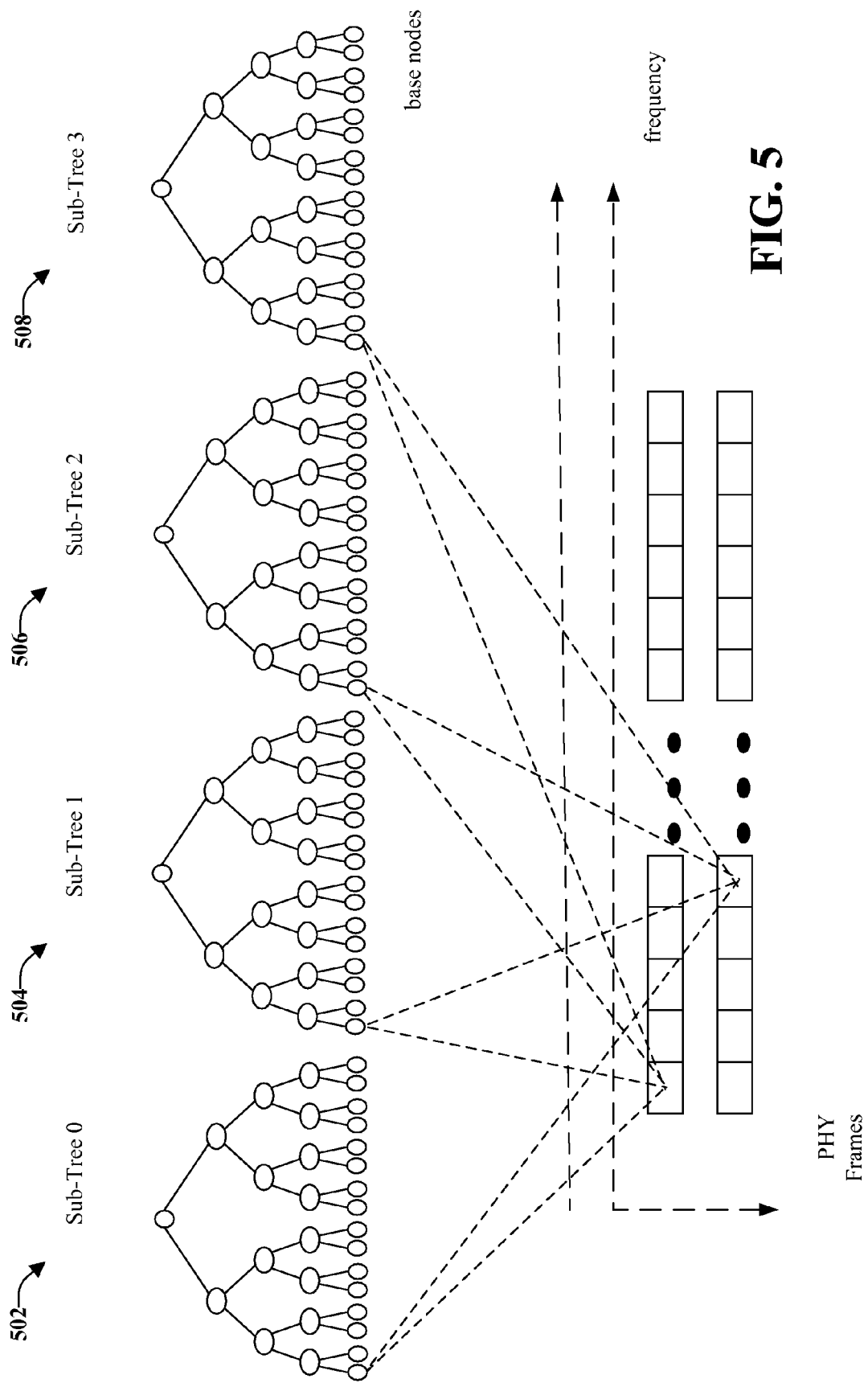
FIG. 5 illustrates a tree structure that places certain restrictions on the use of the traffic channels for an orthogonal system

FIG. 5 illustrates a tree structure that places certain restrictions on the use of the traffic channels for an orthogonal system. For each traffic channel that is assigned, all traffic channels that are subsets (or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time.

As illustrated, a channel tree includes M multiple sub-trees. There are four sub-trees illustrated, labeled Sub-Tree 0 (502), Sub-Tree 1 (504), Sub-Tree 2 (506) and Sub-Tree 3 (508). In this case, there are M maximum combined number of transmit spatial dimensions, based upon the mapping. M may be defined as:

$$M = \max\{M_1 + \ldots + M_n\}$$

where n is the number of spatially multiplexed access terminals and $M_k$ is the MIMO order (e.g., the number of layers or streams) per access terminal.

In an aspect, each sub-tree maps to the same time-frequency resources. In accordance with another aspect, where hopping is used, each sub-tree may have the same hopping pattern. For example, access terminals scheduled on the same nodes of any two sub-trees hop together.

In utilizing SDMA, it should be noted that pilots, transmitted to each user being transmitted to simultaneously, may collide with each other if the pilots are transmitted on the same exact resources.

Therefore, in accordance with some aspects, a collision avoidance algorithm or technique may be utilized by a scheduler or sector to prevent pilot collision. Thus, if multiple resources are allocated to each user, the same resources will not be used for transmission of the pilots for any of the users. In an aspect, this technique utilizes a sub-tree index offset between access terminals in SDMA. In a further aspect, this offset is not less than the total number of spatial dimensions between the access terminals that are being scheduled for overlapping transmission. For example, when four access terminals are to receive one stream each, the offsets for pilot resources are 0, 1, 2, or 3 on each tree, with each tree using a different offset.

In another example, if there are second order MIMO access terminals (e.g., two access terminals receive two streams each), one tree would have an offset of 0 and another would have an offset of 2. In this further example, there is a MIMO access terminal$_1$ (2 streams) and a SIMO access terminal$_2$ (1 stream). The pilots for access terminal$_1$ are sent on the same traffic resources (e.g., corresponding to the same base nodes) as the pilots for terminal$_2$. However, the terminals utilize different code offsets corresponding to different subtrees. The different code offsets generate different pilot signatures and, therefore are not "colliding." In an example, where there are two SIMO access terminals being scheduled, any two offsets may be utilized.

The technique described above provides different pilot signatures for every {layer, access terminal} pair. This also may be enhanced by using a spreading or scrambling code on the pilots that utilizes the offsets for altering the code or scrambling sequence.

Figure 6:
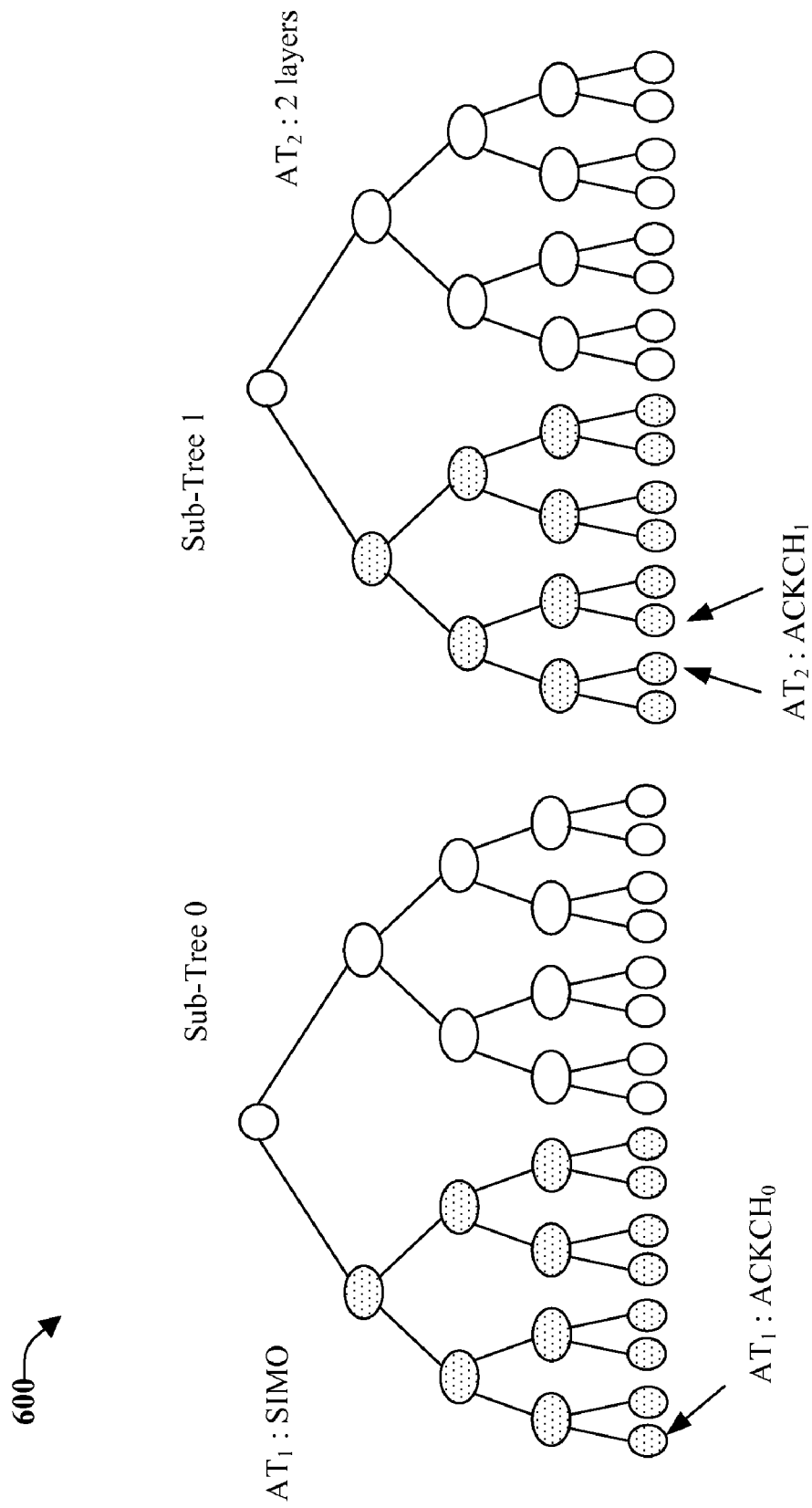
FIG. 6 illustrates aspects of SDMA transmission of acknowledgements (ACKs) by access terminals for reverse link.

FIG. 6 illustrates aspects of SDMA transmission of acknowledgements (ACKs) by access terminals for reverse link, to the access point or sector, for the forward link SDMA transmission. An access terminal with $M_k$ layers, sub-tree index m and assignment consisting of $N_k$ base nodes, sends acknowledgements for the ith layer on an acknowledgment segment, or resources, associated with the base node indexed $\min\{m, N_k-M_k\}+i$ where 0 and $N_k-1$ correspond to the same base node of different sub-trees and i is the layer index.

Figure 7:
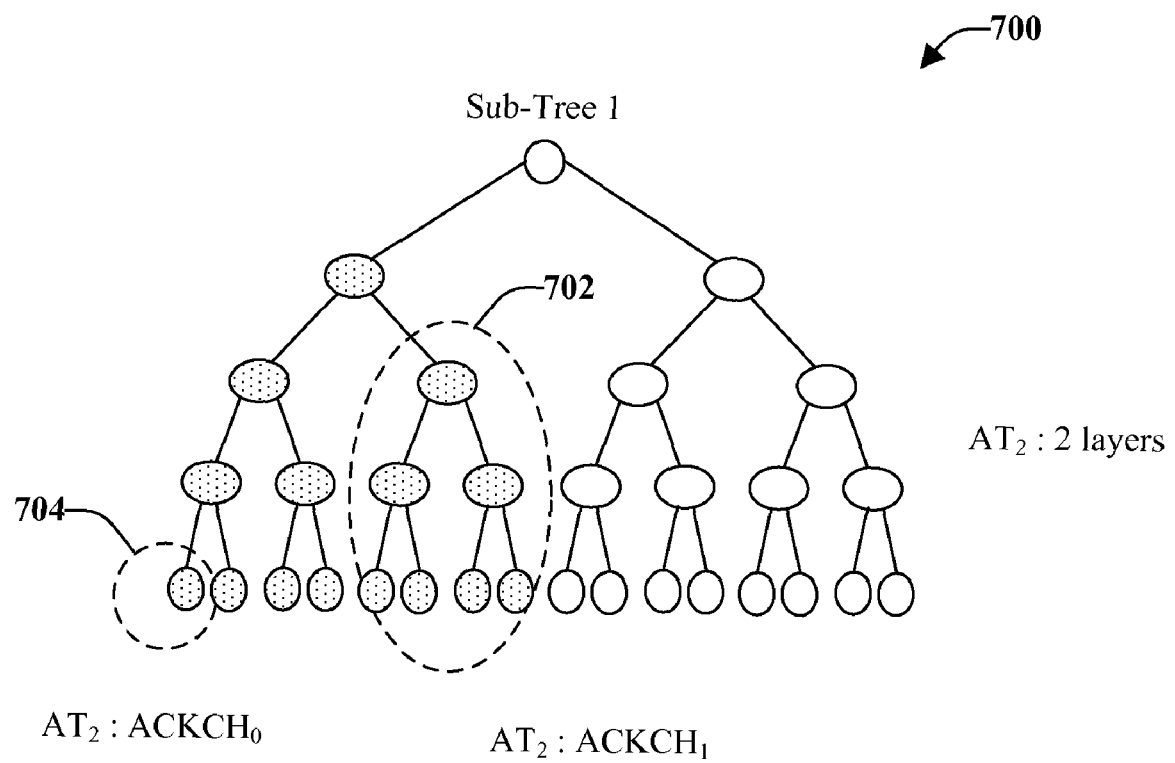
FIG. 7 illustrates aspects to mitigate collisions of the acknowledgements sent on the reverse link.

FIG. 7 illustrates aspects to mitigate collisions of the acknowledgements sent on the reverse link, which can cause throughput issues for the forward link, a scheduler or sector can provide distinct acknowledgement resources for every {layer, access terminal} pair. The acknowledgement is transmitted on a union of assignments given to the union of (pair-wise) SDMA users is at least:

$$N = \sum_{p=i}^{n} M_p$$

This provides a distinct acknowledgment resource for every {layer, access terminal} pair ensured with the above acknowledgment resource mapping rule if all users are assigned the same traffic resources: $N_k=N$. An assignment of individual access terminals can be reduced without changing its acknowledgement resource location. Thus, this can be facilitated by eliminating nodes (illustrated within dotted circle 702) after the node that carries the last acknowledgment segment of this access terminal. In accordance with another aspect, this may be augmented by next eliminating nodes (illustrated within dotted circle 704) before the node that carries the last acknowledgment segment of this access terminal.

Figure 8:
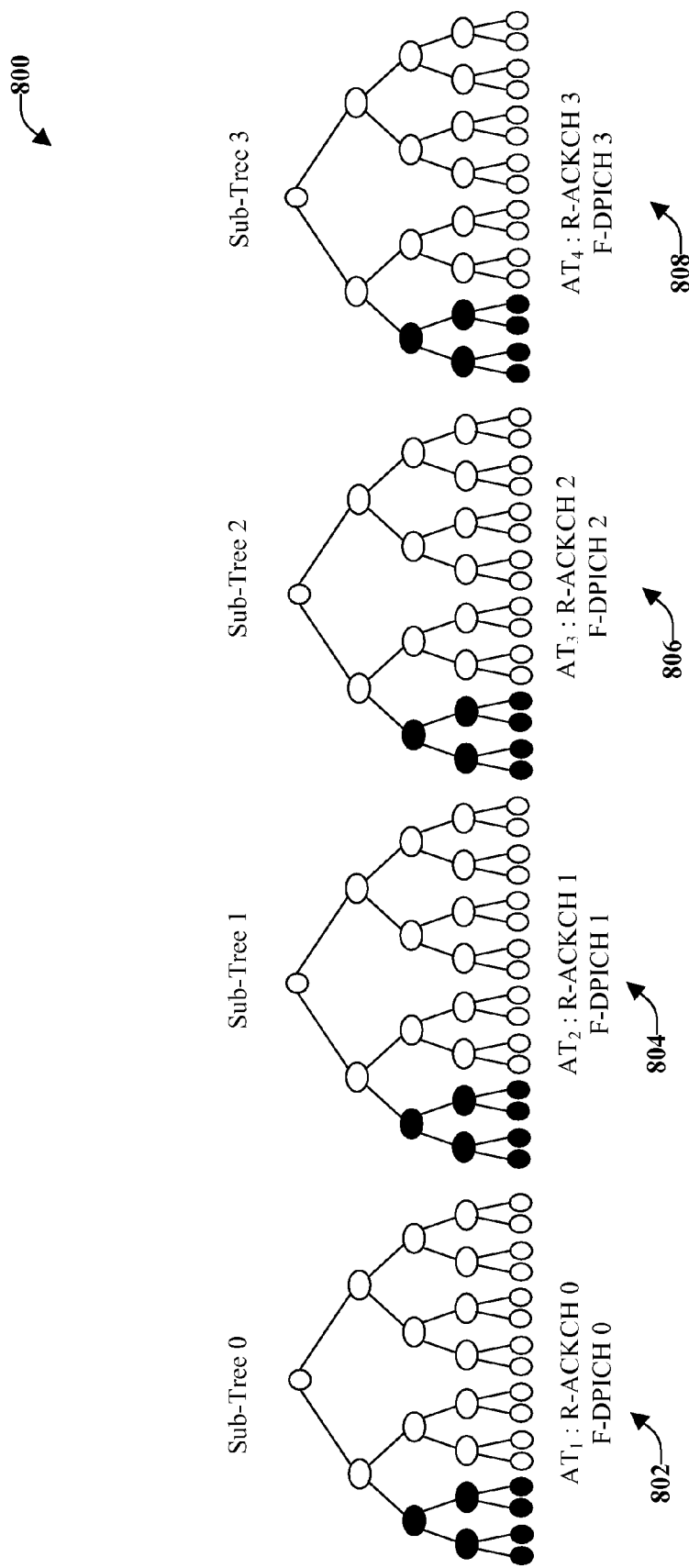
FIG. 8 illustrates a four sub-tree structure for four access terminals

Referring to FIG. 8, illustrated is a four sub-tree structure 800 for four access terminals, illustrated at 802, 804, 806, and 808. Each of the four access terminals 802-808 have one stream each being transmitted over an overlapping time period for overlapping frequency resources. As illustrated, a combination of acknowledgment resource, reverse link, and pilot resource assignment, forward link, is assigned, so that each sub-tree, and thus each user, is assigned a different offset then each other sub-tree. The different code offsets provide different pilot signatures to mitigate "colliding" of pilots. Thus, the pilots for the different terminals are sent on the same nodes (e.g., similar to traffic) but use different code offsets (and therefore different pilot signatures) to mitigate collision.

Figure 9:
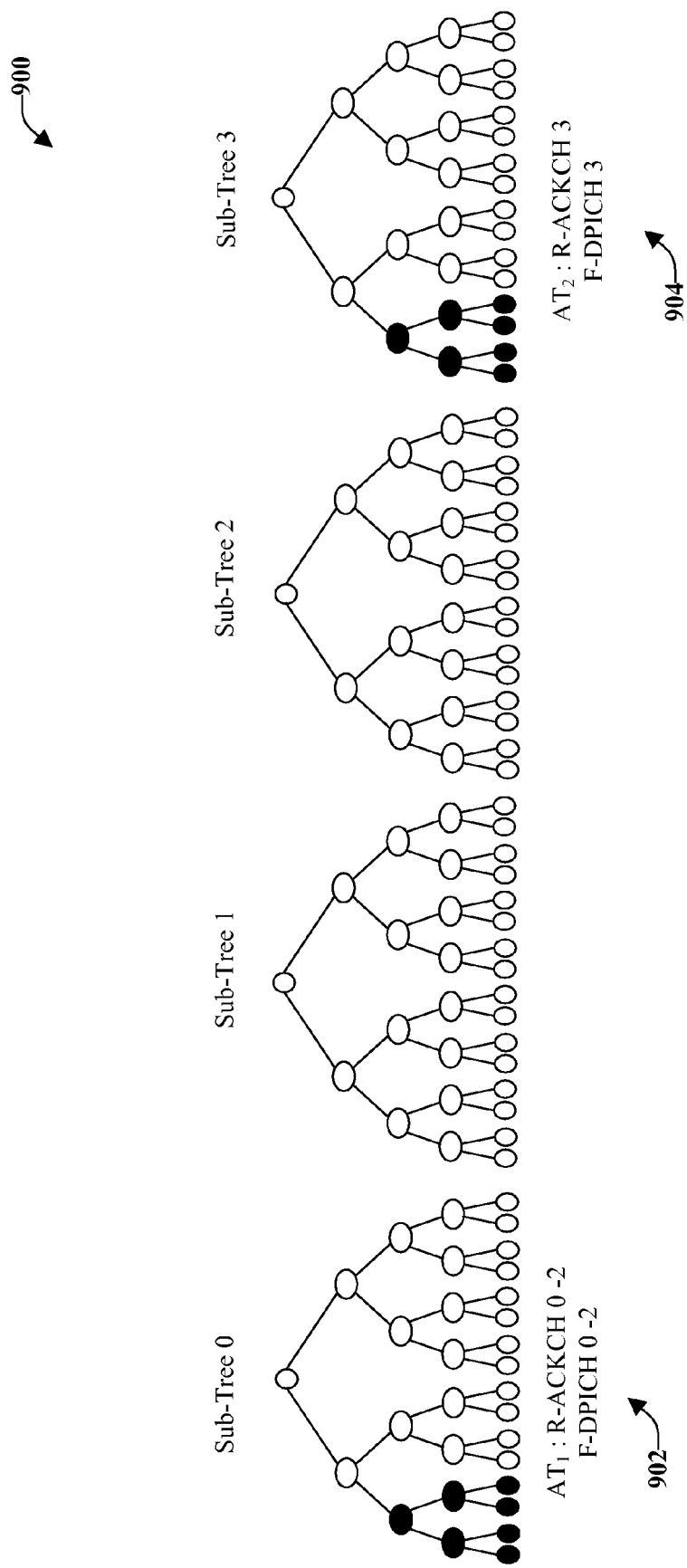
FIG. 9 illustrates a four sub-tree structure for two access terminals, where one terminal has three streams being transmitted and the other terminal has one stream being transmitted.

Referring to FIG. 9, a four sub-tree structure 900 for two access terminals 902 and 904, where one terminal 902 has three streams being transmitted and the other terminal 904 has one stream being transmitted over an overlapping time period for overlapping frequency resources. As illustrated, a combination of acknowledgment resource, reverse link, and pilot resource assignment, forward link, is assigned, so that each sub-tree, and thus each user, is assigned a different offset then each other sub-tree that is being used. Each terminal 902 and 904 utilizes different code offsets (e.g., different pilot signatures) to mitigate collision of ACKs. However, each terminal 902, 904 receives pilots that are sent on the same node.

Figure 10:
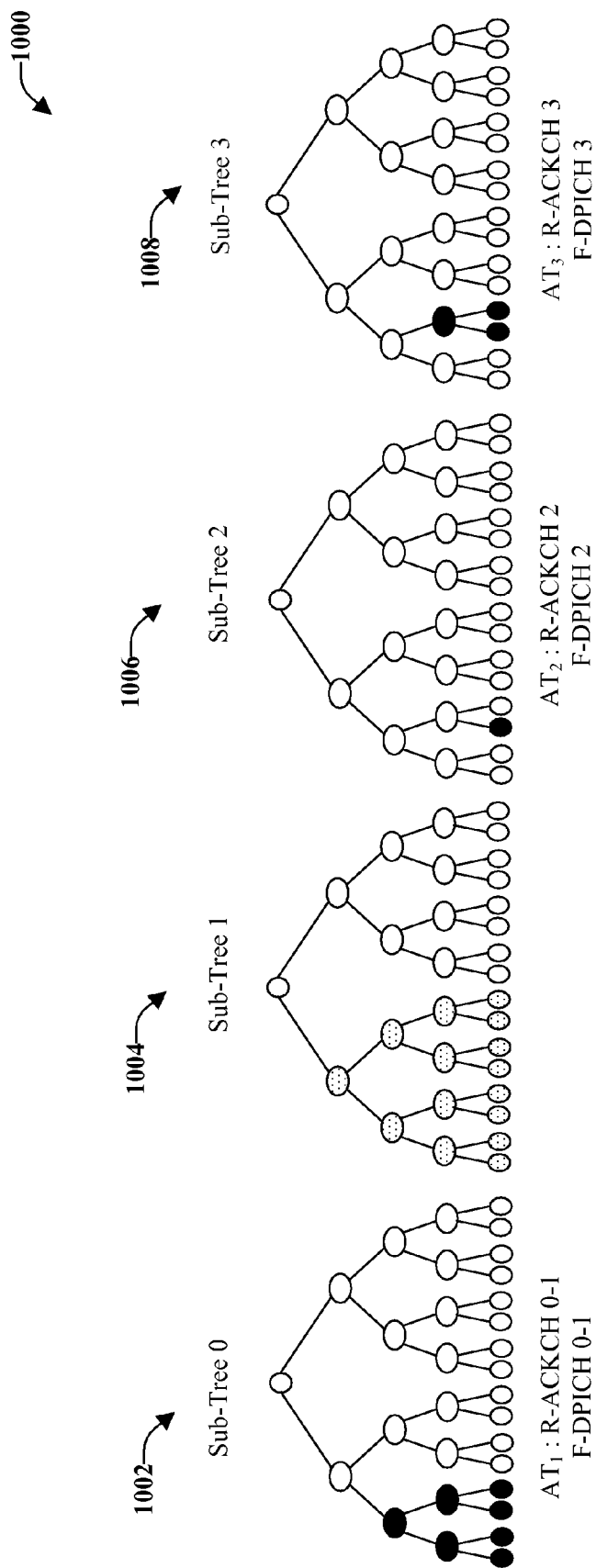
FIG. 10 illustrates a four sub-tree structure for three access terminals, where two have one stream being transmitted and other has two streams.

Referring to FIG. 10, illustrated is a four sub-tree structure 1000 for three access terminals, where two have one stream being transmitted and other has two streams over an overlapping time period for overlapping frequency resources. As illustrated, a combination of acknowledgment resource, reverse link, and pilot resource assignment, forward link, is assigned, so that each sub-tree, and thus each user, is assigned a different offset then each other sub-tree that is being used. Thus, the base node on each tree for the acknowledgment and pilot as illustrated as different.

It should be noted, while the above figures illustrate that each sub-tree has assignments of the acknowledgment and pilot resources to the same node, this need not be the case and the acknowledgement and pilot node may be different on each tree, provided each sub-tree assignment is offset from each other sub-tree for each node.

Figure 11:
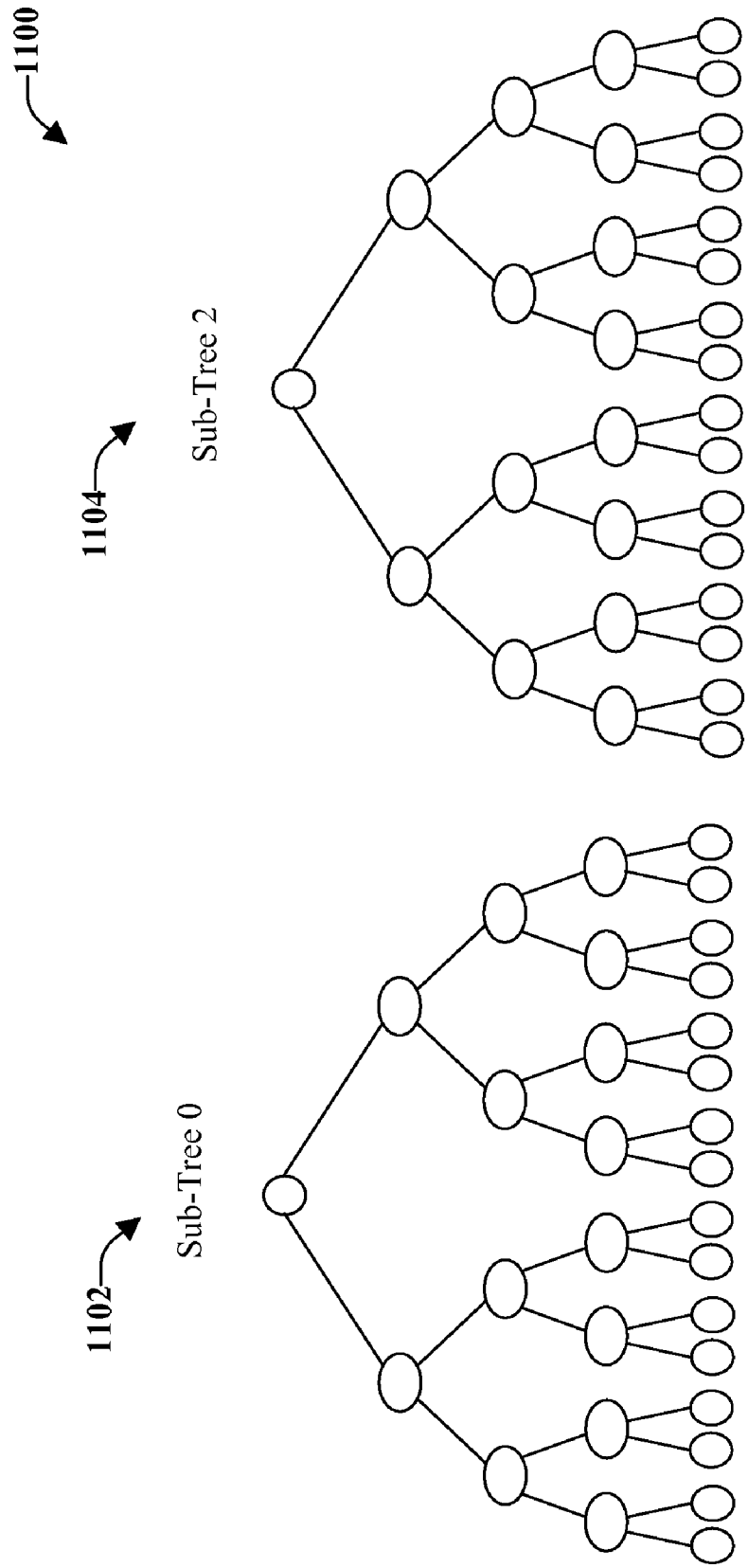
FIG. 11, illustrates another exemplary sub-tree structure

Referring to FIG. 11, illustrated is another exemplary sub-tree structure 1100. As discussed above, the number of sub-trees can be reduced from the maximum number of spatial dimensions down to the maximum number of spatially multiplexed (SM), SDMA, users. This can be achieved by labeling the sub-trees with a non-contiguous indexes. As illustrates a tree has two-sub-trees, labeled Sub-Tree 0 (1102) and Sub-Tree 1 (1104), which can support up to two SM access terminals with up to a second order MIMO or no SM, (e.g., one user with up to fourth order MIMO).

In an aspect, a specific channel may be utilized to provide a description of the primary sub-tree and the total tree size. This channel may be a frame or super-frame preamble. The information contained therein should be sufficient to demodulate pages and system information on a data channel. The offsets may be transmitted on different sub-trees carried as part of a channel information message. In an aspect, the offsets may be sent approximately every 200 ms.

While the discussion, with respect to the figures is in the context of channel trees, it applies to any logical resources that may be partitioned and utilized to schedule users for SDMA transmission on the forward link on overlapping time and frequency resources.

Figure 12:
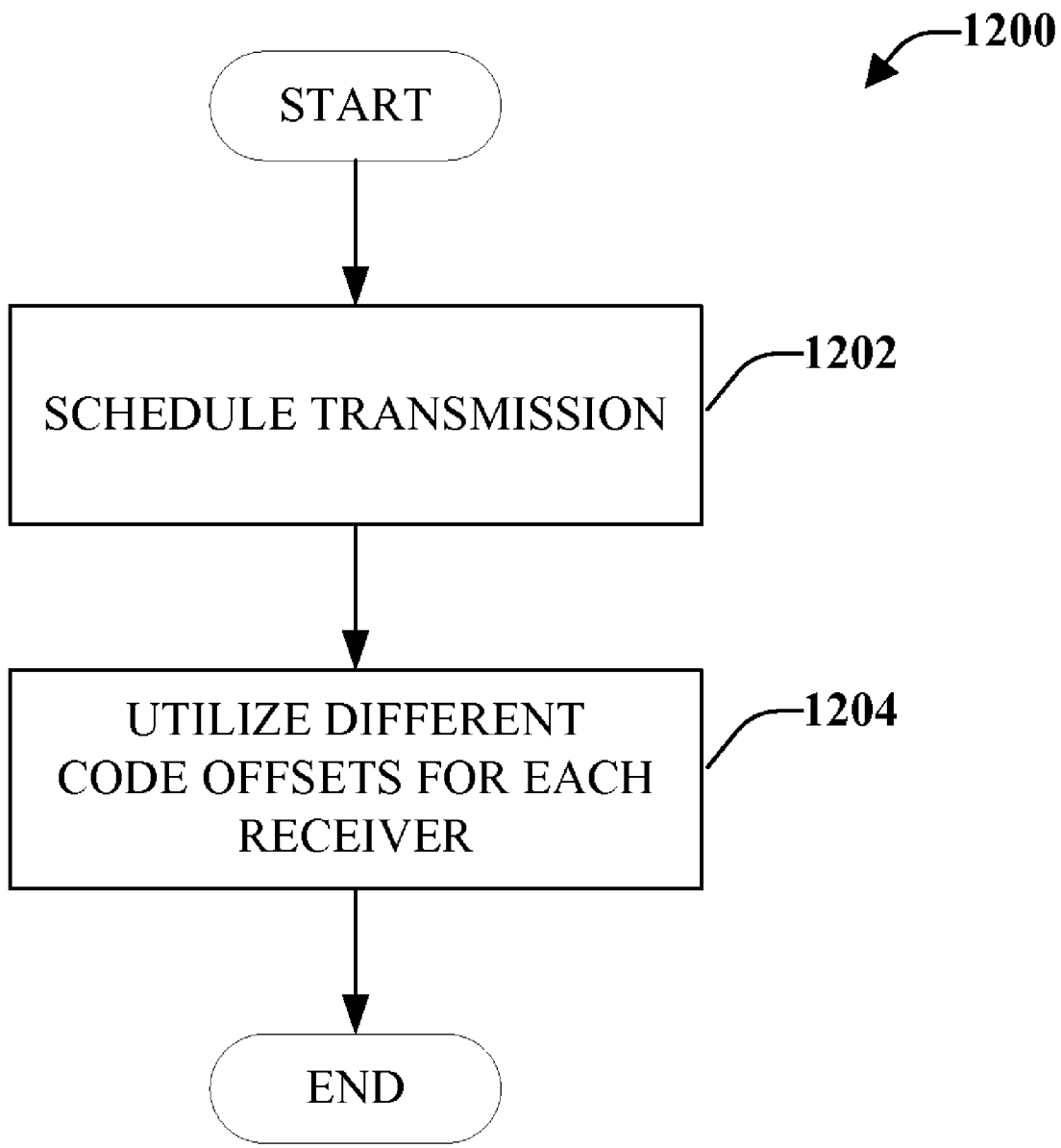
FIG. 12 illustrates a method for facilitating channelization in a wireless communication system.

With reference now to FIG. 12 illustrates a method 1200 for facilitating channelization in a wireless communication system. While, for purposes of simplicity of explanation, the method is shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methods described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 1200 starts, at 1202, when a transmission is scheduled. This transmission can be scheduled for at two or more terminals on overlapping frequency resources and for an overlapping time period of different spatial resources. The overlapping frequency resources can partially overlap or completely overlap. Each of the two or more terminals can be scheduled utilizing a different sub-tree of a channel tree. In accordance with some aspects, acknowledgements of the transmissions to the two or more terminals are scheduled so that the acknowledgement is transmitted on non-overlapping time or frequency resources.

At 1204, different code offsets are utilized for pilots sent to the at least two terminals. The different code offsets can correspond to different sub-trees. This offset can be on the overlapping time or frequency resources. The offset creates different pilot signatures and can mitigate the chances of the pilot transmissions overlapping. Additionally, the pilots can utilize a code that is offset by at least a number of spatial dimensions utilized for transmission to one or more of the terminals. The pilot signatures can be assigned to channel sub-trees in a non-contiguous manner. In accordance with some aspects, the number of sub-trees is less than a number of available dimensions. The description of all sub-trees (except for the first sub-tree) can be deferred to later overhead channels since this information is not necessary to demodulate control segment and overhead channels send in non-MIMO non-SDMA mode.

In accordance with some aspects, method 1200 can utilize a scheduling technique to reduce the assignment size without changing positions of ACKS. To facilitate this reduction, method 1200 can assign a subset of nodes by eliminating nodes after the node that carries the last acknowledgment segment of this access terminal. After these nodes are eliminated, method 1200 can assign a subset of nodes by eliminating nodes before the node that carries the last acknowledgment segment of this access terminal.

Figure 13:
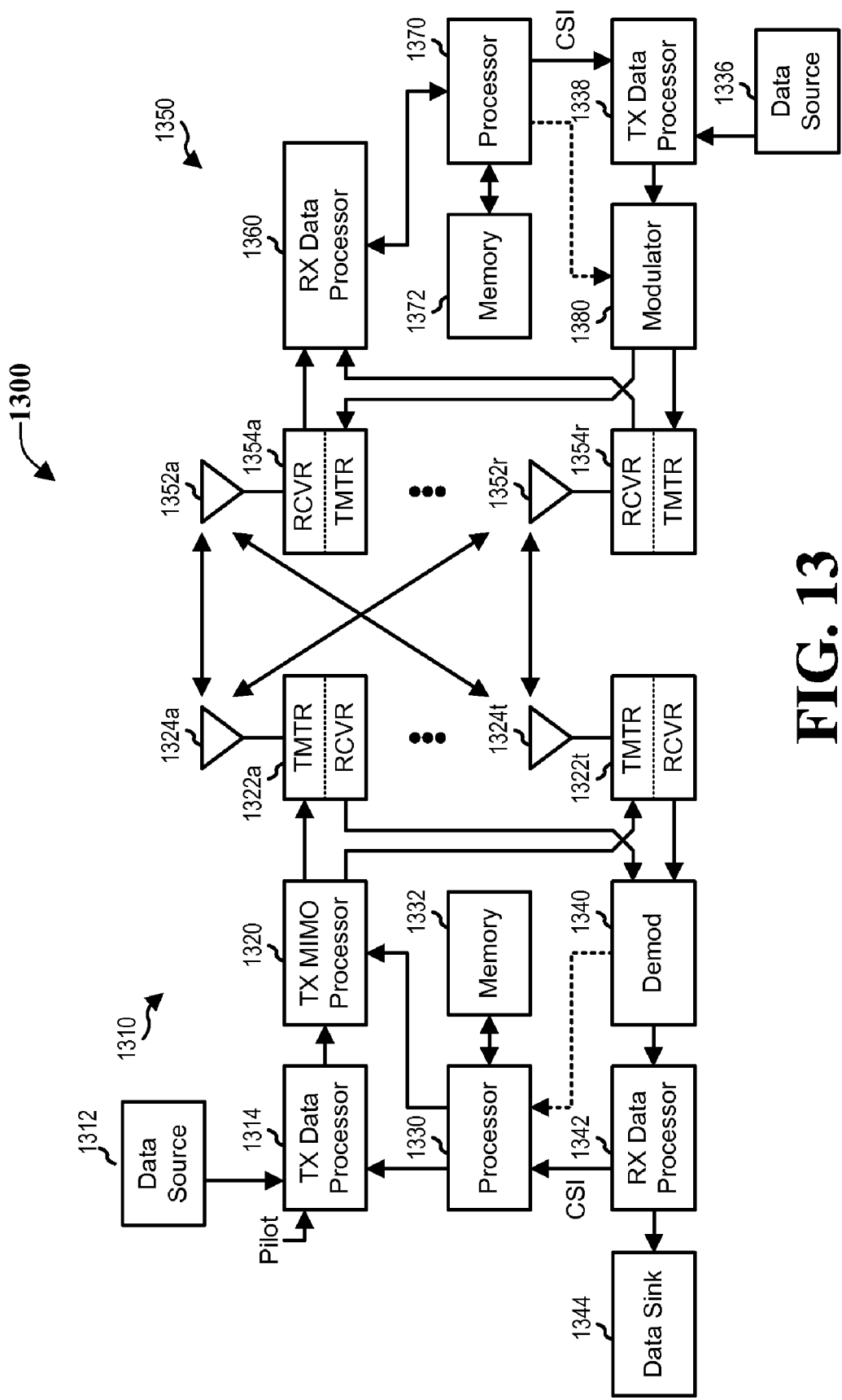
FIG. 13 illustrates a block diagram of an embodiment of a transmitter system and a receiver system.

Referring to FIG. 13, a block diagram of an embodiment of a transmitter system 1310 and a receiver system 1350 in a MIMO system 1300 is illustrated. At transmitter system 1310, traffic data for a number of data streams is provided from a data source 1312 to transmit (TX) data processor 1314. In an embodiment, each data stream is transmitted over a respective transmit antenna. TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or MQAM) selected for that data stream to provide modulation symbols. The data rate, coding, and modulation for each data stream may be determined by instructions performed on provided by processor 1330.

The modulation symbols for all data streams are then provided to a TX processor 1320, which may further process the modulation symbols (e.g., for OFDM). TX processor 1320 then provides NT modulation symbol streams to NT transmitters (TMTR) 1322a through 1322t. Each transmitter 1322 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 1322a through 1322t are then transmitted from NT antennas 1324a through 1324t, respectively.

At receiver system 1350, the transmitted modulated signals are received by NR antennas 1352a through 1352r and the received signal from each antenna 1352 is provided to a respective receiver (RCVR) 1354. Each receiver 1354 conditions (e.g., filters, amplifies, and downconverts) a respective received signal, digitizes the conditioned signal to provide samples, and further processes the samples to provide a corresponding "received" symbol stream.

An RX data processor 1360 then receives and processes the NR received symbol streams from NR receivers 1354 based on a particular receiver processing technique to provide NT "detected" symbol streams. The processing by RX data processor 1360 is described in further detail below. Each detected symbol stream includes symbols that are estimates of the modulation symbols transmitted for the corresponding data stream. RX data processor 1360 then demodulates, deinterleaves, and decodes each detected symbol stream to recover the traffic data for the data stream. The processing by RX data processor 1318 is complementary to that performed by TX processor 1320 and TX data processor 1314 at transmitter system 1310.

The channel response estimate generated by RX processor 1360 may be used to perform space, space/time processing at the receiver, adjust power levels, change modulation rates or schemes, or other actions. RX processor 1360 may further estimate the signal-to-noise-and-interference ratios (SNRs) of the detected symbol streams, and possibly other channel characteristics, and provides these quantities to a processor 1370. RX data processor 1360 or processor 1370 may further derive an estimate of the "operating" SNR for the system. Processor 1370 then provides channel state information (CSI), which may comprise various types of information regarding the communication link and/or the received data stream. For example, the CSI may comprise only the operating SNR. The CSI is then processed by a TX data processor 1378, modulated by a modulator 1380, conditioned by transmitters 1354a through 1354r, and transmitted back to transmitter system 1310.

At transmitter system 1310, the modulated signals from receiver system 1350 are received by antennas 1324, conditioned by receivers 1322, demodulated by a demodulator 1340, and processed by a RX data processor 1342 to recover the CSI reported by the receiver system. The reported CSI is then provided to processor 1330 and used to (1) determine the data rates and coding and modulation schemes to be used for the data streams and (2) generate various controls for TX data processor 1314 and TX processor 1320. Alternatively, the CSI may be utilized by processor 1370 to determine modulation schemes and/or coding rates for transmission, along with other information. This may then be provided to the transmitter that uses this information, which may be quantized, to provide later transmissions to the receiver.

Processors 1330 and 1370 direct the operation at the transmitter and receiver systems, respectively. Memories 1332 and 1372 provide storage for program codes and data used by processors 1330 and 1370, respectively.

At the receiver, various processing techniques may be used to process the NR received signals to detect the NT transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

As used herein, the terms broadcast and multicast may be applied to the same transmission. That is, a broadcast need not be sent to all terminals of an access point or sector.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with instructions (e.g., procedures, functions, and so on) that may be utilized to perform functions described herein. The instructions may be stored in a memory (e.g., memory 1330, 1372x or 1372y in FIG. 13) or other computer program product and executed by a processor (e.g., processor 1332, 1370x or 1370y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Figure 14:
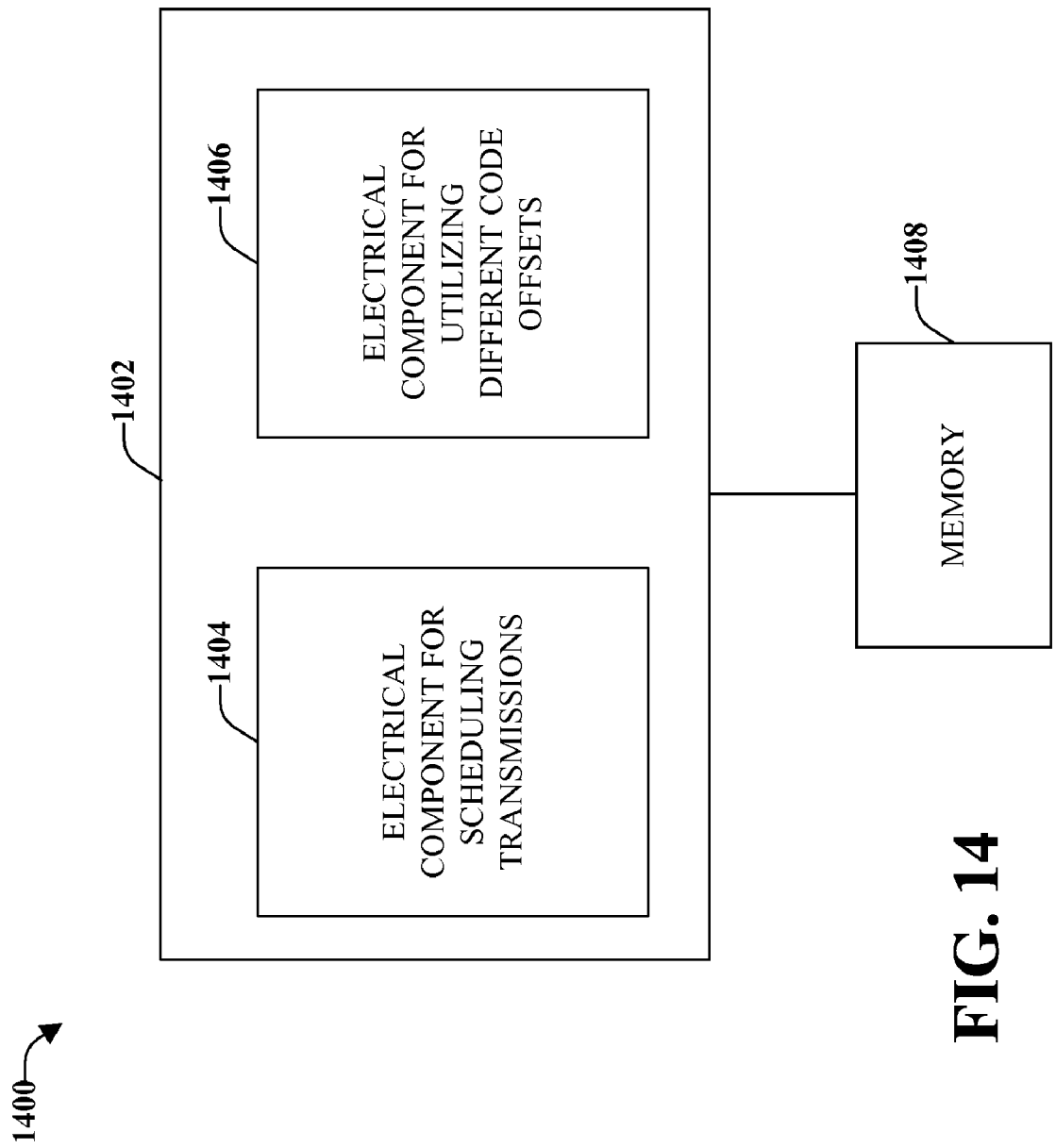
FIG. 14 illustrates a system for space division multiple access channelization.

FIG. 14 illustrates a system 1400 for space division multiple access channelization. For example, system 1400 may reside at least partially within a base station. It is to be appreciated that system 1400 is represented as including functional blocks, which may be functional blocks that represent functions implemented by a processor, software, or combination thereof (e.g., firmware).

System 1400 includes a logical grouping 1402 of electrical components that can act separately or in conjunction. For instance, logical grouping 1402 can include an electrical component for scheduling transmissions 1404. The transmissions can be scheduled to two or more terminals on overlapping frequency resources for overlapping time periods on different spatial resources. Also, include in logical grouping 1402 can be an electrical component for utilizing different code offsets for the pilot assignments 1406. The different code offsets correspond to different sub-trees and produce different pilot signatures. The pilot assignments can be offset so that the pilot transmissions do not overlap.

In accordance with some aspects, electrical component 1404 includes a component for scheduling each of the terminals utilizing a different sub-tree of a channel tree. Alternatively or additionally, electrical component 1406 includes a component for offsetting the pilots by at lest a number of spatial dimensions utilized for transmission to at least one of the terminals.

Additionally, system 1400 can include a memory 1408 that retains instructions for executing functions associated with electrical components 1404 and 1406 or other components. While shown as being external to memory 1408, it is to be understood that one or more of electrical components 1404 and 1406 may exist within memory 1408.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for facilitating channelization in a wireless communication system, comprising:
    scheduling transmission to at least two terminals on overlapping frequency resources for an overlapping time period on different spatial resources; and
    utilizing different code offsets for pilots sent to the at least two terminals, wherein the different code offsets correspond to different sub-trees.

2. The method of claim 1, wherein the different code offsets create different pilot signatures.

3. The method of claim 2, further comprising assigning the pilot signatures to channel sub-trees in a non-contiguous manner.

4. The method of claim 1, wherein the number of sub-trees is less than a number of available dimensions.

5. The method of claim 1, wherein scheduling comprises scheduling acknowledgement of the transmissions to the at least two terminals on the overlapping frequency resources for the overlapping time period on different spatial resources so that the acknowledgment is transmitted on non-overlapping time or frequency resources.

6. The method of claim 1, wherein the overlapping frequency resources partially overlap.

7. The method of claim 1, wherein the overlapping frequency resources completely overlap.

8. The method of claim 1, further comprising:
    assigning a subset of nodes by eliminating nodes after a node that carries a last acknowledgement segment; and assigning a subset of nodes by removing nodes before the node that carries the last acknowledgement to reduce an assignment size while maintaining the positions of the acknowledgements.

9. The method of claim 1, wherein the description of subsequent sub-trees is deferred to later overhead channels.

10. A wireless communications apparatus, comprising:
a processor that executes instructions for scheduling transmission to at least two terminals on overlapping frequency resources for overlapping time periods on different spatial resources, so that pilots transmitted to the at least two terminals utilize different code offsets; and
a memory that stores information relate to the instructions executed by the processor.

11. The wireless communications apparatus of claim 10, wherein the electronic device comprises a scheduler.

12. The wireless communications apparatus of claim 10, wherein the electronic device comprises an access point.

13. The wireless communications apparatus of claim 10, wherein the different code offsets create different pilot signatures so that the pilots do not collide.

14. The wireless communications apparatus of claim 10, wherein the processor is configured to schedule each of the at least two terminals utilizing a different sub-tree of a channel tree.

15. The wireless communications apparatus of claim 10, wherein the processor is configured to schedule acknowledgement of the transmissions to the at least two terminals on the overlapping frequency resources for the overlapping time period on different spatial resources, so that the acknowledgment is transmitted on non-overlapping time or frequency resources.

16. The wireless communications apparatus of claim 10, wherein the overlapping frequency resources partially overlap.

17. The wireless communications apparatus of claim 10, wherein the overlapping frequency resources completely overlap.

18. A wireless communications apparatus that provides space division multiple access channelization, comprising:
means for scheduling transmission to at least two terminals on overlapping frequency resources for overlapping time periods on different spatial resources; and
means for utilizing different code offsets for pilots sent to the at least two terminals, wherein the different code offsets correspond to different sub-trees.

19. The wireless communications apparatus of claim 18, wherein the means for scheduling comprises means for scheduling each of the at least two terminals utilizing a different sub-tree of a channel tree.

20. The wireless communications apparatus of claim 18, wherein scheduling comprises scheduling acknowledgement of the transmissions to the at least two terminals on the overlapping frequency resources for the overlapping time period on different spatial resources so that the acknowledgment is transmitted on non-overlapping time or frequency resources.

21. The wireless communications apparatus of claim 18, wherein the pilot signatures are assigned to channel sub-trees in a non-contiguous manner.

22. The wireless communications apparatus of claim 18, the number of sub-trees is less than a number of available dimensions.

23. A machine-readable medium having stored thereon machine-executable instructions for:
scheduling transmission to at least two terminals on overlapping frequency resources for overlapping time periods on different spatial resources; and
utilizing different code offsets for pilots sent to the at least two terminals, wherein the different code offsets correspond to different sub-trees.

24. An apparatus operable in a wireless communication system, the apparatus comprising:
a processor configured to:
schedule transmission to at least two terminals on overlapping frequency resources for overlapping time periods on different spatial resources; and
utilize different code offsets for pilots sent to the at least two terminals, wherein the different code offsets correspond to different sub-trees.

* * * * *

UNITED STATES PATENT AND TRADEMARK OFFICE
CERTIFICATE OF CORRECTION

| | | |
|---|---|---|
| PATENT NO. | : 7,903,615 B2 | Page 1 of 1 |
| APPLICATION NO. | : 11/869589 | |
| DATED | : March 8, 2011 | |
| INVENTOR(S) | : Gorokhov et al. | |

It is certified that error appears in the above-identified patent and that said Letters Patent is hereby corrected as shown below:

Column 19, line 13, claim 10: "information relate to" to read as --information relating to--

Column 19, line 16, claim 11: "the electronic device comprises" to read as --the wireless communications apparatus is--

Column 19, line 18, claim 12: "the electronic device comprises" to read as --the wireless communications apparatus is--

Column 20, line 12, claim 20: "scheduling comprises scheduling" to read as --the means for scheduling comprises means for scheduling--

Signed and Sealed this
Thirteenth Day of March, 2012

David J. Kappos
*Director of the United States Patent and Trademark Office*